United States Patent [19]

Cupp

[11] Patent Number: 5,604,987
[45] Date of Patent: Feb. 25, 1997

[54] LASER LEVEL, ACCESSORIES AND METHOD OF USE

[75] Inventor: John P. Cupp, 1825 Bridgetown Rd., #501, Feasterville, Pa. 19053

[73] Assignee: John P. Cupp, Feasterville, Pa.

[21] Appl. No.: 386,632

[22] Filed: Feb. 10, 1995

[51] Int. Cl.$^6$ ............................................. G01C 5/00
[52] U.S. Cl. ........................... 33/275 R; 33/290; 33/389; 33/DIG. 21
[58] Field of Search ................................. 33/290, 275 R, 33/263, 282, 285, 384, 388, DIG. 21

[56] References Cited

U.S. PATENT DOCUMENTS

| | | |
|---|---|---|
| 739,242 | 9/1903 | Weber . |
| 2,877,555 | 3/1955 | Visockis, Jr. . |
| 2,993,281 | 7/1961 | Dock ........................................ 33/384 |
| 3,242,340 | 3/1966 | Layne . |
| 3,521,364 | 7/1970 | Metcalfe . |
| 3,588,255 | 6/1971 | Alexander . |
| 3,897,637 | 8/1975 | Genho . |
| 4,031,629 | 6/1977 | Paluck ...................................... 33/290 |

FOREIGN PATENT DOCUMENTS

| | | | |
|---|---|---|---|
| 401815 | 12/1990 | European Pat. Off. ............... | 33/389 |
| 345467 | 5/1960 | Switzerland ........................... | 33/389 |
| 92/20998 | 11/1992 | WIPO ...................................... | 33/354 |

*Primary Examiner*—Thomas B. Will
*Attorney, Agent, or Firm*—Dann, Dorfman, Herrell and Skillman

[57] ABSTRACT

A support for a laser beam generator in a carpenter's level is positioned on the level so that the laser beam generated will lie in the plane of a flat reference surface of the level. A battery or other power supply is housed in the carpenter's level together with circuitry to connect the power supply to the laser beam generator and preferably a switch allowing the generator to be turned off and on. Gauges may be employed in the level for vertical, as well as horizontal, orientation to the reference surface and, if desired, a gauge enabling the reference surface to be repeatedly placed at a predetermined angle relative to the horizontal may be included. Such a gauge may be a commercial gauge such as an inclinometer. Preferably, however, a conventional gauge employing an arcuate tube filled with liquid having a bubble in it which seeks the highest level of the tube with calibration marks for accurately positioning the bubble. Such a gauge rotatably supported, but frictionally held in a selected position relative to the level enables a selected angle for the reference surface to repeatedly be used even without calibration. With calibration, it enables a selected angle relative to horizontal to be set from the calibrations so that the reference surface may be oriented at that set angle when using the level.

11 Claims, 3 Drawing Sheets

5,604,987

LASER LEVEL, ACCESSORIES AND METHOD OF USE

The present invention relates to a carpenter's level or similar device, primarily one incorporating laser generator means which generates a beam in the plane of the reference surface. Thus, when the reference surface is put in the plane or against the plane of a surface to be extended and the beam is intercepted by a transverse surface, a mark within the extended plane is able to be made at the point of interception on the beam. Multiple marks can be made at other points of interception in the same or other transverse surfaces. Even in planning work where a line is involved, if the line can placed in the plane, and if the plane can be defined, such as being a horizontal plane, then marks in the plane of the reference surface where the laser beam strikes an intercepting surface can be made.

Many applications for a level providing a beam in the actual plane of the reference surface can be demonstrated, but such a device has not been available in the prior art. Devices using laser beams with levels have been known, but none within the actual reference plane. Thus, in such a laser level the mark in the beam at the intercepting surface is not in the actual plane. Therefore, another step involving measurement is required. If the intercepting surface is not normal to the laser beam, the matter becomes complicated because the distance between point of laser contact and the actual reference surface is not the same as the distance between the laser beam and the reference surface. The importance of having a laser beam in the actual reference surface apparently has not been understood in the prior art. Furthermore, many applications become feasible where the laser beam is directly in the plane of the reference surface which are otherwise cumbersome.

Using the laser level of the present invention for construction projects can be as simple as, for example, laying out the plane of a drop ceiling in a room. In such a situation from a selected mark at a desired height on a particular wall in a corner, the laser level can be placed with its reference surface at the height of the mark level to a horizontal plane in the usual way and leveled horizontally. The resulting laser beam striking a transverse wall in the adjacent corner will indicate a point in the same horizontal plane, which can be marked on the transverse wall where the beam impinges by placing a mark in the middle of a beam. The other adjacent corner may then be marked in the same way, following which the laser level may be taken to one of the adjacent corners and set up in the same way to project against a transverse wall of the fourth corner. In this way, marks defining a common horizontal level for a drop ceiling, for example, can be quickly identified and the structure for supporting the ceiling may be set up relative to those marks or lines drawn between them.

A turntable may be used in a similar way, directing the laser beam to successive points on transverse walls once the turntable has been leveled. The present invention provides a simple turntable construction which enables a user to take advantage of any generally horizontal support surface, even if it is not truly horizontal. The same thing can be done attaching the turntable to a tripod. In each case a level platform relative to which rotation can occur is required.

The laser level of the present invention can also be used on non-horizontal surfaces or to lay out or position similar non-horizontal surfaces once a standard, such as the angle of a roof rafter, has been established. In some versions of the invention, commercially available devices, such as inclinometers, may be used enabling a repetitive positioning of the level until the desired angle is achieved, that is, the same reading of the inclinometer is obtained.

Alternatively, the present invention offers a novel adjustable gauge or indicator using a conventional bubble sight tube, for example, but allowing adjustment of its position about an axis normal to a plane to which the reference surface is perpendicular and in which the laser beam lies. Use of the gauge simply involves placing the reference surface against a member to be repetitively installed like rafters and rotatably adjusting the indicator, such as a sight glass until it shows a level condition. Such an arrangement can be used without calibration for repetitive work such as rafters, but calibration is useful for many applications and can be done by marking either the rotatable indicator or the level with a 360° circular scale. The pointer is then placed on the other member so that zero (360°) on the scale will be opposite the index pointer when the instrument is set for horizontal orientation of its reference surface.

More specifically, the laser level of the present invention comprises a carpenter's level having at least a flat reference surface and a gauge built into the level to allow an observer to determine when said reference surface is horizontal. The laser beam generator is fixed on the level in position so that the laser beam generated lies in the plane of the reference surface. Support means for power means, such as a battery, is provided on the level. The circuit for energizing the laser beam generator includes at least connectors for connecting the power generator means into the circuit with the laser beam generator. Preferably a switch is also provided in series with the power means and laser generator means so that the laser beam generator may be turned off when not in use.

It is useful to have a gauge built into the level to indicate when the reference surface is vertical, as well as a gauge to indicate when the reference surface is horizontal. Additionally, it is useful to have a gauge built into the level to indicate at what angle between vertical and horizontal the reference surface lies.

An improved laser level in accordance with the present invention employs a carpenter's level having at least a flat reference surface. A laser beam generator is fixed in position relative to the level so that the laser beam lies in the plane of the flat reference surface. Support means for power means is provided on the level for receiving and holding power means. A circuit for energizing laser beam generators is provided including at least connectors for connecting the power means and circuit with the laser beam generator. A gauge is supported by the level in such a way that it is rotatably adjustable relative to the level by rotation about an axis normal to a plane perpendicular to the reference surface and in which the laser beam lies.

THE DRAWINGS

Specific embodiments of the present invention are shown in the accompanying drawings in which.

DETAILED DESCRIPTION OF THE PRESENT INVENTION

Figure 1:
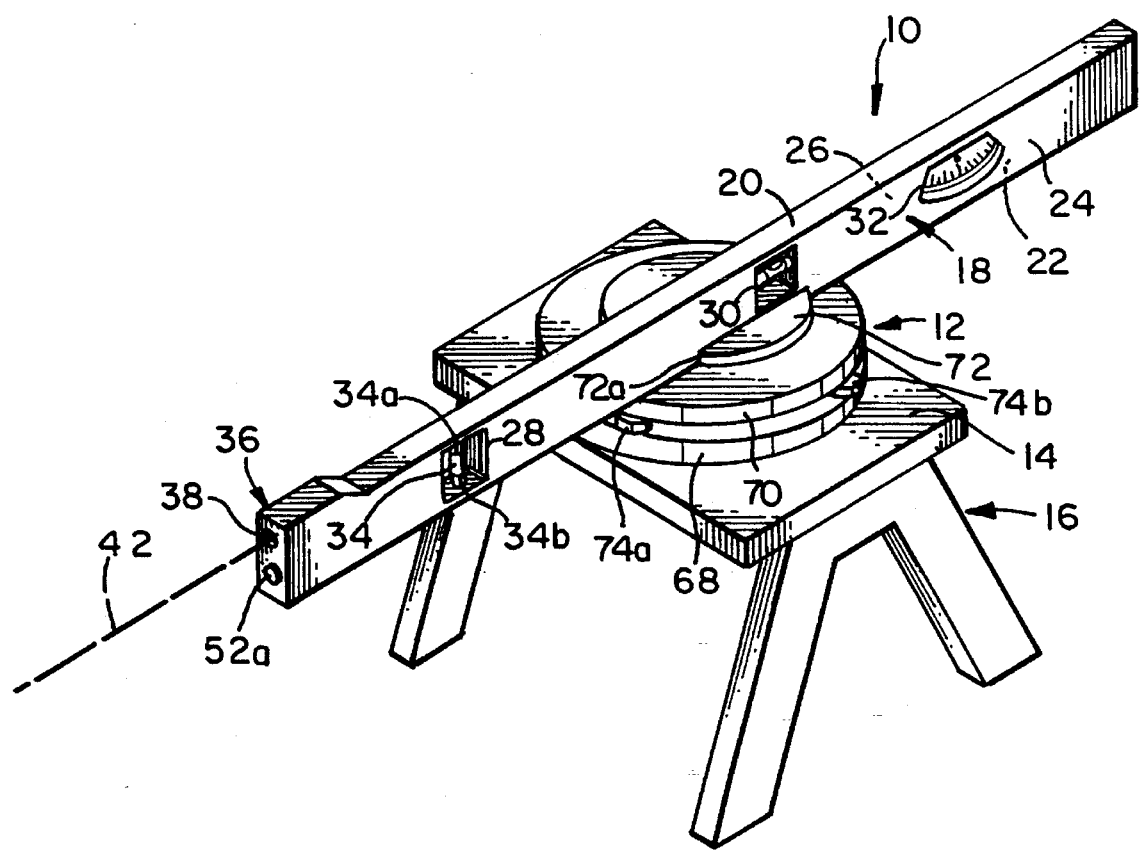
FIG. 1 shows in perspective a carpenter's level in accordance with the present invention in combination with a laser level and horizontal plane defining turntable supported on an available work surface.

Referring now to FIG. 1 a generally familiar carpenter's level 10 with the laser level and associated structure installed in it. The laser level is supported on a rotary turntable 12 which, in turn, is supported on the flat surface 14 which may be the top of a table or stool generally designated 16.

Considering first the level itself, the body 18 is preferably a hollow extruded aluminum alloy. In preferred embodiments the extrusion provides a flat reference surface 20 here oriented to be the top edge. The bottom edge 22 is parallel to the top edge and in many applications can serve as a reference surface as well. Preferably the broad side faces 24 and 26 are flat, parallel to each other and at right angles to edges 20 and 22 so that they may serve as reference surfaces as well. Within the body of the level are gauges 28, 30 and 32, which are advantageous preassembled and press fit into precision openings through the side faces 24 and 26. Gauges 28 and 30 provide curved, sealed, liquid filled tubes which include an air bubble which rises to the highest point in the tube to provide the conventional level indicator. Gauge 28 is oriented to provide a vertical indicator. When a reference surface, such as 20 or 22, is placed against a surface which is intended to be vertical when the bubble in the curved tube 34 lies in the center position typically between two index marks, is vertical. If the surface is not truly vertical, the bubble will be shifted off center. Such a gauge is typical of those seen in carpenter's levels. Preferably lines 34a and 34b are provided around the tube to serve as index marks. These marks allow the viewer to very quickly determine when vertical position is achieved because the bubble is within the lines with its edges touching or adjacent the lines. The bubble as used in the gauge 30 is between similar index marks when the reference surface is horizontal. The gauges 28 and 30 are conventional and used conventionally. Other types of leveling devices, both with horizontal gauges and vertical gauges, are different from gauges 28 and 30. The gauge 32, similarly purchased as a commercially available article sometimes known as an "inclinometer " is also a standard device available from Sunrise Corporation. This device is of a different shape but also may be press fit through correspondingly shaped holes in the walls 24 and 26. The inclinometer measures the angle relative to horizontal at which the reference surface is placed.

Figure 2:
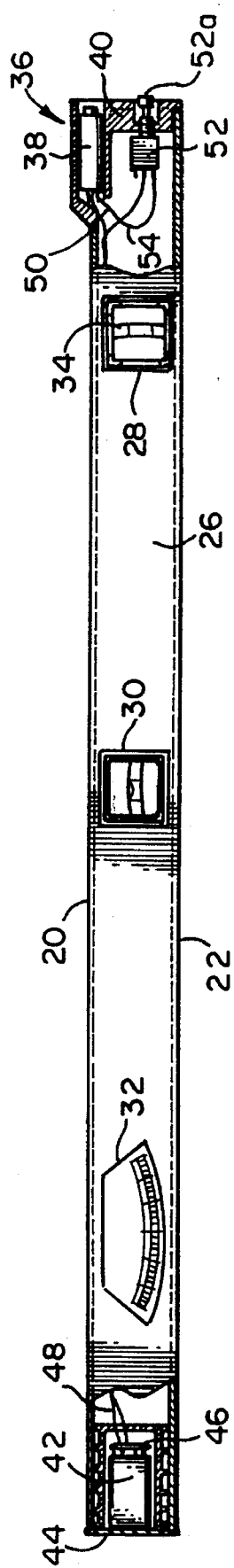
FIG. 2 is a side elevation of a carpenter's level of the type shown in FIG. 1 in side elevation with a section of the level broken away to show internal structure.

Referring to FIG. 2, as well as FIG. 1, a support structure 40 for a laser generator module 38 provides the shape and appearance of the laser assembly. The support structure, generally designated 36, may be made of die castable polymer or aluminum, or other suitable material, to be precisely positioned and snugly received and frictionally retained within a precision machined slot between the sidewalls and against the tops thereof in the plane of the reference surface 20. The support structure 40 provides precision formed shoulders in the plane of the laser beam. The laser generator 38 has edges which provide an aligning surface and a shoulder stop on the cast support structure 40 which positions its beam to lie in the plane of the reference surface 20. The laser generator 38 is frictionally retained in a cylindrical bore in the support structure 40. The laser generator itself 38 is a pre-packaged commercially available module obtainable from various suppliers such as Power Technology and Lyte Optromics. If, as assumed here, the laser generator has a cylindrical geometry, it may be snugly received and precisely supported in a cylindrical bore in the supporting and aligning structure 40. In this way the laser beam 42 generated will be in precise alignment with the reference surface 20 to define a common plane and will also be precisely parallel to the parallel reference surface 22. The laser generator module is a 5 millowatt module designed to be energized by a standard 9 volt battery 42. The battery is housed in a module or cast battery support insert 44 snugly received within the open opposite end of the level structure. The battery support insert is arranged to be held in place by friction so that it is easily removable for replacement of the battery as needed. A conventional battery connector 46 may be provided with a pair of snap-on or frictionally held contact connectors for connecting to the terminals and allows easy replacement and connection of the battery 42. The electrical twin lead conductor 48 has a different conductor connected to each of the battery connectors and is of sufficient length to allow the twin lead conductor 48 to be pulled outside the level where the connection may be more easily made. One lead is connected to one terminal of the laser module. The other terminal of the laser module is connected to one terminal of a switch 52 by conductor 50. The other terminal of the switch 52 is connected by conductor 54 back to the one of the pair of wires 48 not connected to the laser module. The switch 52 is preferably configured to be supported in a cylindrically stepped counter bore in the support structure 40. The switch is actuated by a push button 52a which is recessed from the end of the level structure, but easily accessible to the finger of a user for alternately closing to turn the laser on, and opening to turn the laser off.

Figure 3:
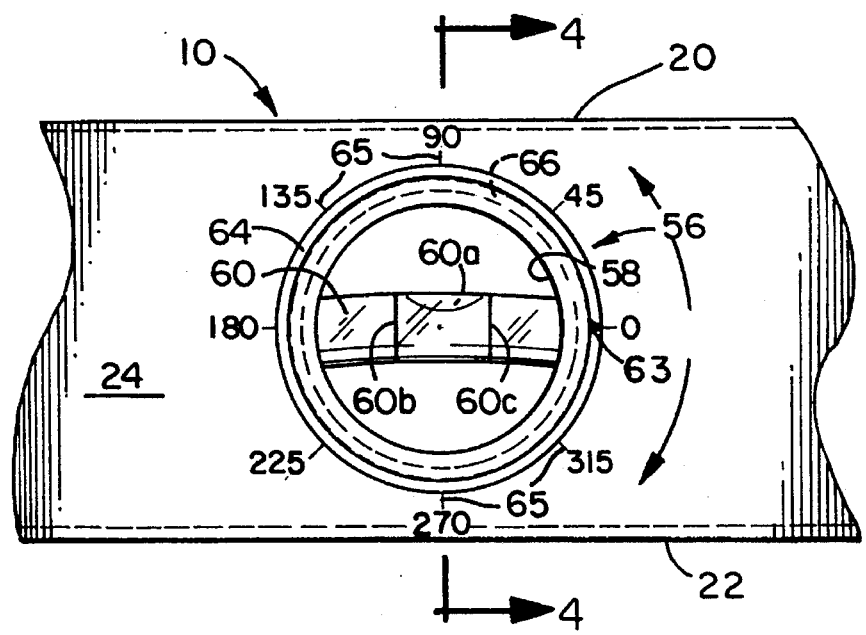
FIG. 3 is a partial plan view of a portion of the carpenter's level in accordance with the invention employing a novel rotatable gauge to better identify when the reference surface is selected at angles to the horizontal.
Figure 4:
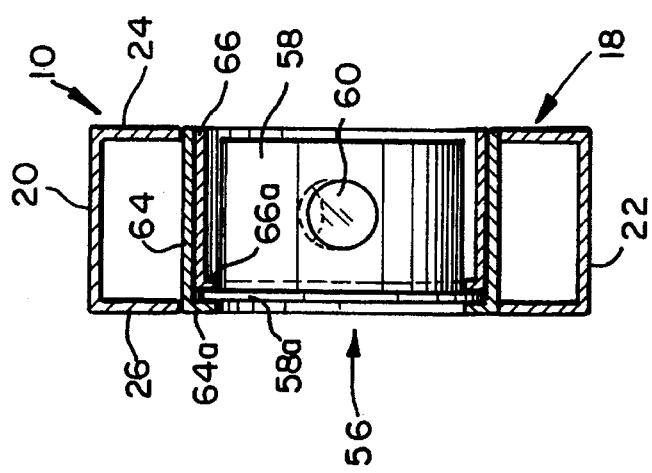
FIG. 4 is a sectional view taken along the line 4—4 of FIG. 3 with the rotational structure in elevation.

An alternative and improved gauge for indicating when the reference surfaces 20 and 22 are at an angle other than horizontal or vertical is shown in FIGS. 3 and 4, generally designated as member 56. It will be understood that this gauge may be substituted for gauge 32 of the inclinometer in FIGS. 1 and 2. Preferably, gauge 56 provides an arcuate closed fluid bubble type indicator or any other type indicator which may be substituted therefor. The bubble indicator has a tubular rotatable support 58. The tubular support 58 is provided at one edge with a circumferential outwardly extending planar ring flange 58a. In this instance, the arcuate tube 60 is anchored in the ring 58. The tube is closed and filled with fluid except for a bubble 62a so that when the indicator is in the position of indicator 30 relative to the level, the bubble will lie between the lines 60b and 60c. The ring 58 is rotatably supported by its flange 58a to move about an axis perpendicular to a plane through the laser beam and perpendicular to reference surface 20. This gauge can also be used in a non-laser level. In any level the ring 58 is rotatable about an axis perpendicular to reference surfaces 24 and 26 and which is parallel to the reference surfaces 20 and 22. Flange 58a is advantageously snugly fitted between two circumferential flanges 64a and 66a. Flange 64a is a circumferential inwardly extending planar flange of tubular ring 64 and flange 66a is a circumferential inwardly extending planar flange of tubular ring 66. Ring 66 is snugly received within ring 64 and frictionally held in place. Ring 64, in turn, is press fitted into circular holes in the walls 24 and 26 of the extrusion forming the level.

FIG. 3 shows calibrations in degrees on the face 24 oriented around the rotatable indicator 56. The rotatable portion 58 is provided with an index mark or pointer 63 which cooperates with a scale of degrees 65, which is marked with great precision, and preferably with considerably greater refinement than shown in FIG. 3, on the surface 24. The indicator means 58 then is effectively adjustable. When the level is placed with a reference surface, such as 20 or 22, against or aligned with an inclined surface, the level gauge is rotatably adjusted until the bubble 60a between its index marks 60b and 60c on the tube 60 is horizontal and the angle of the surface to horizontal will be indicated by the pointer and calibrations. The structure is designed so that flange 58a is frictionally held in position and can be moved only with exertion of some force so that the gauge may be retained in that position while work at that particular angle is being accomplished. Therefore, gauge 56 will indicate that the reference surface 20 or 22 is at the selected angle whenever the bubble 60a is in the center of tube 60 of gauge 56. Conversely, the level may be set at a particular predetermined angle indicated in building plans and used again and again with the angular position retained until that angle for the level is no longer needed for work in progress. Applications of gauge 56 will be shown hereafter.

Returning now to FIG. 1, the structure shown is an arbitrary surface 16 on which rests a flat cylindrical base 68, which is intended to be stationary, but adjustable to horizontal position. The laser 68 rotatably supports the "lazy Susan " cylindrical member 70, which is oriented to rotate on a precision bearing track relative to the base about a general vertical axis, which axis will be made truly vertical by adjustment of the base 68 to a truly horizontal orientation using the level. In turn, the horizontal lazy Susan will support the laser level in a horizontal position so that in any position its laser beam will be horizontal. A convenient way for supporting the laser level is to provide as the rotatable member a raised smaller diameter cylinder 72 provided with a groove 72a having a flat reference bottom on which the level is supported. The groove 72a is provided with very close frictionally fitting sidewalls which will engage the sidewalls 24,26 of the carpenter's level. The sidewalls allow the level to be snugly placed in position so that reference surface 20 or 22 can be easily placed on a flat reference bottom of the groove 72a and yet not allow the level, once positioned, to change position readily. Support of the upper rotatable member may be provided by a ball bearing support, with tracks in the upper member 70 and lower member 68, respectively. The tracks are of the same diameter and grooved so that bearings easily fit within them and keep them aligned. The spacing between the members is shown somewhat exaggerated, but needs to be sufficiently great to permit a sufficient range of adjustment to accomplish leveling. Visible are thumb wheels 74a and 74b. A third thumb wheel 74c is out of view. These are the tops Of generally vertically oriented screw members extending through and threadably engaging base 68 in order to rest in contact with a support surface 14. Horizontal positioning can be achieved by placing the level in place over one of the thumb wheels, 74a, for example, as shown, and adjusting each of the thumb wheels until level is achieved. The lazy Susan is then turned to move the level 10 to a position over the adjacent thumb wheel 74b and the leveling process is repeated. Then finally moving again the laser level to above the third thumb wheel 74c and repeating the leveling process a third time. By the time the third adjustment is made, a level platform for the laser level will have been achieved. From this position the laser level can be used to mark points that are at the same horizontal level in all directions for whatever need there is.

The base will be recognized by those skilled in the art as a tripod and a surveyor's tripod can readily be substituted to achieve a greater range to the level horizontal platform using three infinitely adjustable legs within the range of their movement. The lazy Susan may be replaced by any structure rotatably supported relative to maintain the reference surface of the level in a horizontal plane while it is rotated about a vertical axis. If a reference surface is maintained, the laser beam will remain in the same horizontal plane as rotation about the axis occurs. The applicant's solution to this problem is simple: provide the rotatable member having a level supporting groove with a reference surface at its bottom on which the level reference surface may be placed. Sidewalls of the groove dimensioned to hold the level in place by snugly embracing its sidewalls provide an added working advantage.

Figure 5:
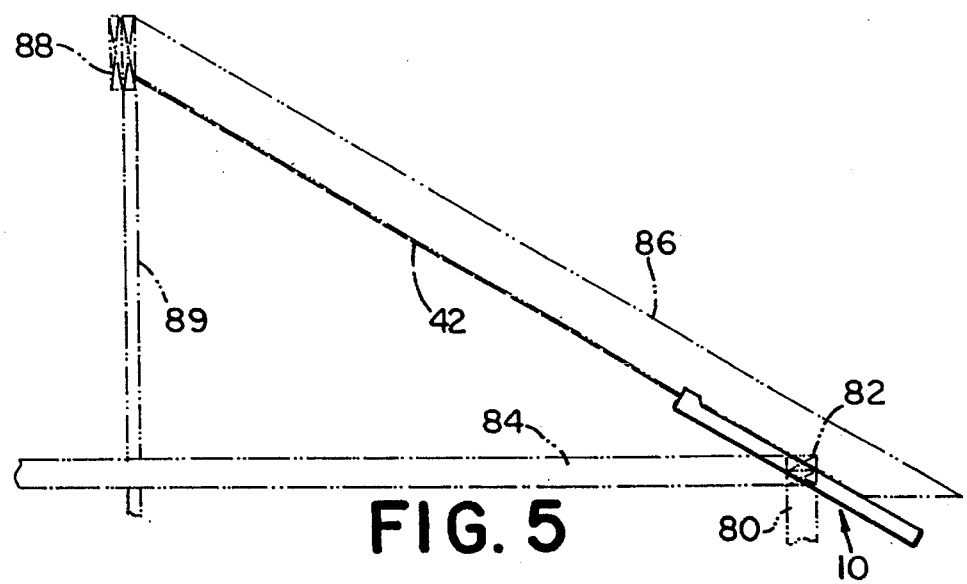
FIG. 5 is a diagrammatic view showing how the laser level of the present invention can be used in applications like installing rafters.

FIG. 5 shows a laser level application whereby rafters can be laid out. Once a building is framed to the roof level with studs 80, plates 82 and 84 and joists in place, the laser level 10 can be placed at the outside of the framing plates along the plate and either set at a desired angle for the rafters 86 or moved to various positions to select an angle. Since the ridge beam 88 is not yet in place, a board 89 may be temporarily nailed to the outside plate, positioned at the center of the structure, but offset enough to allow for thickness of the ridge beam 88. The laser beam 42 will impinge the board where the bottom of the rafter will be and the joint and the plate can be marked. Using the angle of the level, the angle of the cut of the rafter at the ridge can be determined. It can be cut and the rafter placed along the marks and measured to the soffet cut, whose angle can also be easily calculated make it horizontal from the gauge reading on the laser level. As the roof construction proceeds, the laser level can be used to quickly check the angle of the rafters as they are positioned to be installed.

Figure 6:
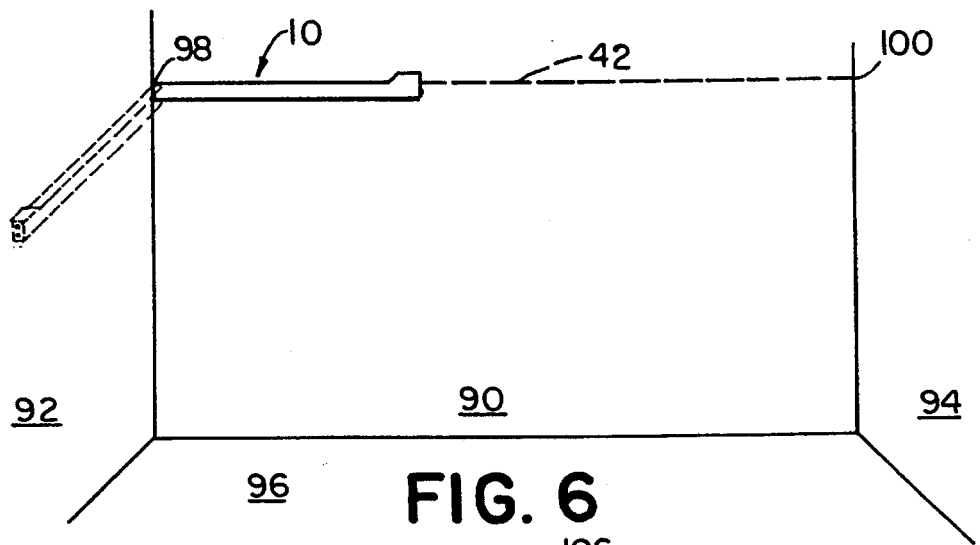
FIG. 6 is a building construction application using the laser level in a conventional horizontal mode for the location of reference points in a common horizontal plane.

FIG. 6 demonstrates another use for the laser level when installing a drop ceiling in a rectangular room, for example. Shown are three walls, 90 at the center and 92 and 94 adjoining the center wall at corners. The floor 96 is shown for reference. After selecting a desired height for the ceiling, a mark 98 is placed on the wall 90 at one corner adjacent wall 92. The reference surface 20 of the level is lined up with the mark 98 and leveled horizontally along wall 90. Laser 42 impinges wall 94 at point 100 at an adjacent corner. A helper marks wall 94 where the laser impinges at point 100 in a common horizontal plane with mark 98. The laser level is then placed along wall 92, lined up with mark 98, leveled and the a laser impinges the fourth wall (not shown) which is marked by a helper at the point of impingement again at the same horizontal plane. The laser level is moved to one of the marked adjacent corners. For example, it may be placed along wall 94 with the reference surface 20 in the plane of the laser at the level of point 100, leveled and the point of laser impingement on wall 94 in the fourth wall corner marked. There are then four marks at four corners all in the same horizontal plane which may be connected by lines if desired. In any event, the marks will allow the workmen to keep the ceiling horizontal at the selected level.

Figure 7:
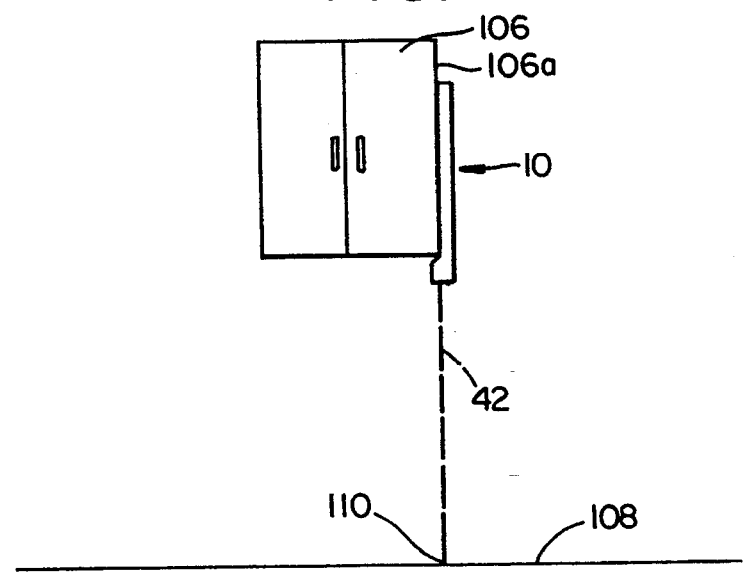
FIG. 7 illustrates a conventional simple vertical application of the laser level using the level to install cabinets.

FIG. 7 shows a more elementary use of a laser level for aligning cabinets, for example. In FIG. 7 an upper cabinet 106 is installed first using one sidewall as the surface to be kept vertical using gauge 28 of laser level 10. Once that cabinet is installed, the reference surface 20 which is in line with the sidewall is placed against the reference cabinet sidewall and the point of impingement 110 of laser beam 42 on the floor 108 is marked. Additional points in line with the cabinet sidewall may be detected by the laser beam and marked to provide guidance for location at the floor. Vertical positioning adjustment of the lower cabinet may be accomplished in the same manner used with the upper cabinet. Alternatively, of course, a lower cabinet might be installed first and used to provide alignment of an upper cabinet.

The present invention includes a number of structures, which are subject to variation and various methods of use. It will be clear to those skilled in the art that many variations on the embodiments shown and described are possible. All such variations and modifications within the scope of the claims are intended to be within the scope and spirit of the present invention.

I claim:

1. A laser level comprising;
   a carpenter's level having at least a flat reference surface and a gauge built into the level to allow an observer to determine when said reference surface is horizontal;
   a laser beam generator fixed in position relative to the level so that the laser beam lies in the plane of the flat reference surface;
   support means for power means on the level for receiving and holding power means; and
   a circuit for energizing the laser beam generator including at least connectors for connecting the power means in the circuit with the laser beam generator.

2. The laser level of claim 1 in which the circuit includes switch means in series with the power means and the laser beam generator.

3. The level of claim 1 in which means is built into the level to sense when the reference surface is vertical.

4. The level of claim 1 in which a gauge is built into the level to sense at what angle between vertical or horizontal the reference surface lies.

5. A laser level comprising:
   a carpenter's level having at least a flat reference surface;
   a laser beam generator fixed in position relative to the level so that the laser beam lies in the plane of the flat reference surface;
   support means for power means on the level for receiving and holding power means;
   a circuit for energizing the laser beam generator including at least connectors for connecting the power means in the circuit with the laser beam generator; and
   a gauge rotatably supported by the level in such a way that it is rotatably adjustable relative to the level by rotation about an axis normal to a plane to which the reference surface is perpendicular and in which the laser beam lies.

6. The laser level of claim 5 in which cooperating scale and index marks are provided, respectively, one on the level and the other on rotatable portions of the gauge showing angular adjustment positions of the gauge and the reference surface of the level to enable pre-position of the gauge at a selected angle relative to the reference surface to enable the gauge to be set so that the gauge can be repeatedly used to quickly place the reference surface and its laser beam extension at the selected angle.

7. The laser beam level of claim 5 in which the gauge is a closed arcuate tube filled with fluid except for an air bubble when the gauge itself is horizontally oriented but at the angle to the reference surface of the selected surface from horizontal.

8. The laser beam level of claim 6 in which the rotatably supported gauge is manually adjustable so that when the reference surface is positioned relative to a structure at a particular angle, the gauge may be adjusted and fixed in that position for repetitive use thereafter to repeat that same angle of the reference surface.

9. A method of using a laser level device wherein the laser provides a laser beam extending in the plane of a reference surface of the laser level device comprising:
   placing the level on a surface to be extended;
   projecting the laser beam into a surface transverse to the surface on which the level is placed; and
   marking the transverse surface against which the laser beam impinges at the center of the beam at the point of impingement.

10. The method of claim 9 in which the process is repeated with the laser level reference surface on the same surface at a different location or in a different direction to impinge a second point on the surface impinged in the initial position, marking the second point and joining the two marks.

11. A method of installing a ceiling or other horizontal structure in a room where vertical walls exist comprising:
   selecting a height for the ceiling or other horizontal structure at one corner and placing a mark there;
   placing against the wall at the level of the mark an edge of a reference surface of a laser level in whose referenced plane a laser beam lies and adjusting the laser level to horizontal position so that the horizontal beam of the laser impinges a transverse wall in an adjacent corner;
   marking the point of laser impingement on the wall in that corner;
   repeating the process from the original corner on the other wall so that the laser beam impinges the transverse wall in the other adjacent corner and marking the point of impingement;
   moving to one of the adjacent corners and using its marking as a point in the plane;
   repeating the process from the original corner so that the laser beam lies in the plane of that mark and impinges a transverse wall in the fourth corner; and
   repeating the marking process at the point of impingement on the wall in the fourth corner.

* * * * *